Patented Nov. 19, 1935

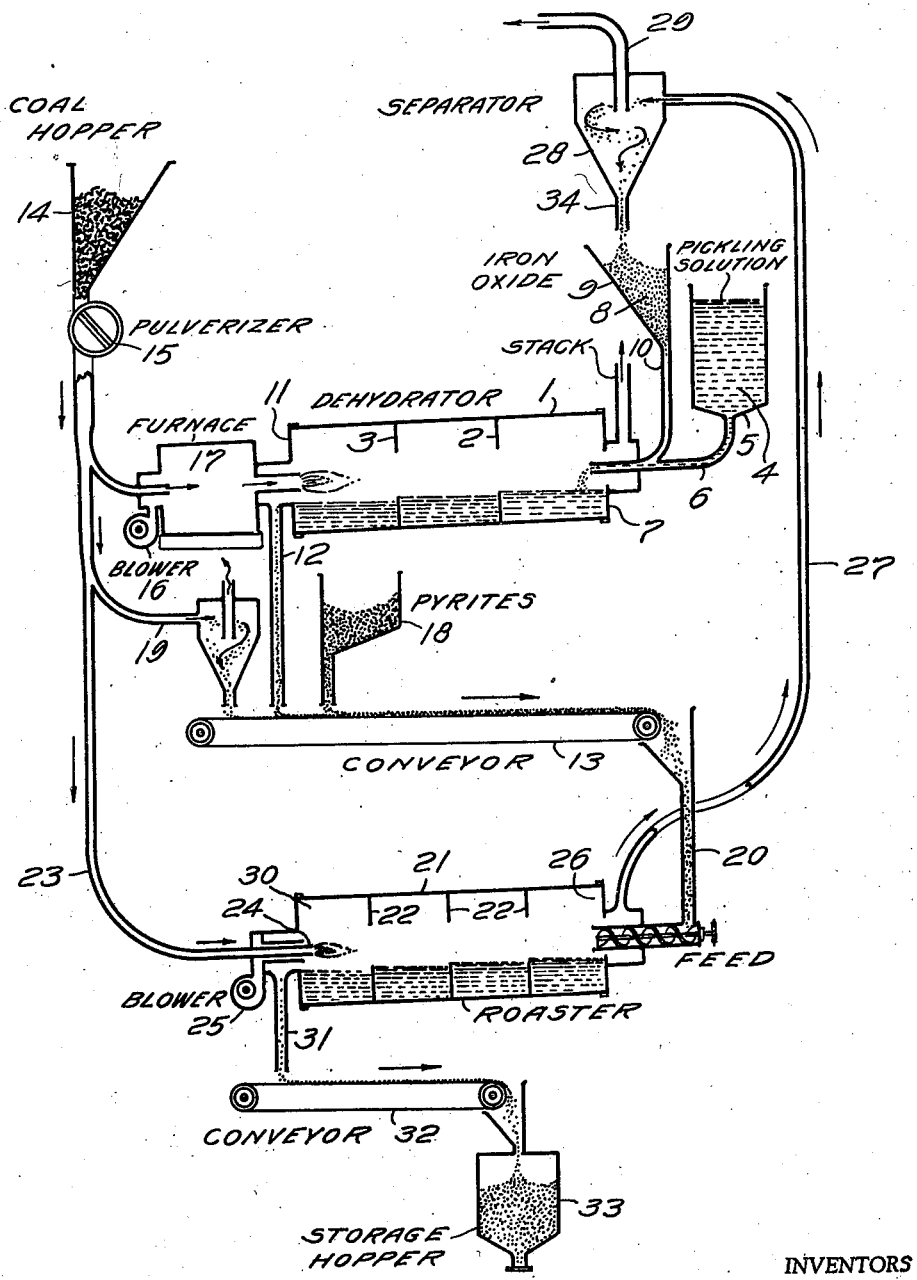

2,021,867

UNITED STATES PATENT OFFICE 2,021,867

METHOD OF TREATING ACID SOLUTIONS

Thomas C. Oliver, Great Neck, and Samuel F. Spangler, Scarsdale, N. Y., assignors to Chemical Construction Corporation, New York, N. Y., a corporation of Delaware Application May 10, 1933, Serial No. 670,272
In Great Britain January 28, 1933

7 Claims. (Cl. 23—177)

This invention relates to the treatment of solutions containing salts and the free acids thereof, for the purpose of recovering the acid radical therein. More particularly, the present invention is concerned with the treatment of the waste solutions produced in the steel industry from acid solutions used for the cleaning of ferrous metals, commonly known as pickling solutions.

The spent pickling solutions usually contain fairly large amounts of ferrous and/or ferric sulphate and a small amount of free sulphuric acid and often the content of these substances is relatively high. Ordinarily the spent liquors contain perhaps 1% of $H_2SO_4$ and up to 20% of iron sulphate. In some cases the amount of $H_2SO_4$ is greater and in a special instance where the solution was used in the production of a mineral pigment it contained 12 to 20 per cent of iron sulphate and as much as 17 to 24 per cent of free sulphuric acid. In spite of the large content of valuable free acid these solutions cannot be further used except with difficulty and at great expense. It is, therefore, highly desirable to provide a process for recovering the valuable sulphate radical in such a form as to make it usable and to this end there have been proposed a number of processes whereby the sulphate radical is recovered by first mixing the iron salt with a reducing agent and then heating until a reaction takes place liberating substantially all of the sulphur content in the form of $SO_2$ which is then oxidized to $SO_3$ and thereby converted into substantially pure sulphuric acid, which may now again be utilized.

The present invention is designed as an improvement in such process whereby certain advantages of operation are obtained. It makes it possible to recover from spent acid solutions not only the acid fixed as sulphate but also the free acid in a single simple operation. Previously there was used a cumbersome wasteful and expensive method whereby the solution was partially evaporated and cooled to crystallize some sulphate and the cycle was repeated. It never produced a pure acid and the crystallized sulphate was contaminated with acid causing a nuisance besides a loss of acid.

The basis of the present invention is the use of an oxide to neutralize the free acid and thereby facilitate the succeeding steps of the process. In actual practice with spent pickling solutions of sulphuric acid, oxide of iron is used and preferably this oxide is in the dust form and preferably derived from a later stage of the process, in order that the reaction thereof with the acid may be facilitated. In the later steps of the process wherein the residue of iron oxide is roasted to give the final product, a certain amount of light, fine iron oxide dust, which has been considered undesirable, is formed and this is collected in a well known dust collecting system. For the present invention this dust is highly desirable as it combines large volume with large surface area for the action of the acid, whereby the reaction to form ferrous sulphate, for example, is greatly facilitated.

We usually provide a substantial excess over the theoretical amount of oxide necessary to neutralize the free acid and such excess may be from 40% to 110% over the theoretical amount and even more. An excess of oxide has no detrimental effect in the later steps of the process and it has the great advantage of causing the neutralizing reaction to go to completion in a short time. An excess of about 50% has been found generally satisfactory. Furthermore, the dust added to this stage of the process will to a great extent become sintered at the end of the process and thus be converted into a more desirable form.

The oxide preferably used in this process is specifically an oxide of iron and this is generally a mixture of the various well-known oxides, such as $FeO$, $Fe_2O_3$, $Fe_3O_4$ depending upon the conditions in the final sintering operation. Usually it is principally $Fe_3O_4$ with a minor amount of $FeO$, and a little $Fe_2O_3$. Whatever the composition the final result is the same, namely, it neutralizes the free sulphuric acid.

We have found that under ordinary conditions iron oxide does not react with sulphuric acid to neutralize the same. We have found that a reaction may be caused to occur between iron oxide and sulphuric acid only at certain strengths of acid and at certain temperatures. We have found that it is necessary to heat the solution to above the boiling point of water and preferably to a temperature of about 230° to 235° F. and up to about 250° F., and to have the acid at a strength of about 30 to 40 per cent $H_2SO_4$. Under such conditions the reaction of the acid with the oxide takes place with a fair degree of rapidity and it goes readily to completion.

We have further found that the presence of iron sulphate in the pickling solution has a distinct effect on the reaction which takes place between the iron oxide and the free acid. A solution containing a definite amount of iron sulphate and to which there is added a sufficient amount of iron oxide to neutralize all the free acid gave no reaction at the boiling temperature when the mixtures contained from 20 to 25 per cent of free acid. When the acid concentration at the boiling point was 30 per cent some reaction was apparent. When the concentration was 35% the reaction was more noticeable and in a 40% acid concentration the reaction was rapid.

On the other hand when a mixture of sulphuric acid solution with iron oxide was made in the absence of iron sulphate quite different results were obtained. Mixtures at the boiling point containing from 20 per cent up to 50 per cent of sulphuric acid gave no reaction with iron oxide. When the acid concentration was 55 per cent at the boiling temperature some slight action was noticeable and at 60 per cent concentration the action was vigorous. From these results we believe that iron sulphate is of material assistance in promoting the reaction between free sulphuric acid and iron oxide.

In the accompanying drawing constituting a part hereof the single figure is a flow-sheet showing diagrammatically an apparatus which is adapted to carry out the present invention.

There is provided a slightly inclined cylindrical drum kiln or dehydrator 1 having baffles 2 and 3 for the purpose of dehydrating a solution 4 which is contained in a vessel 5 from which a pipe 6 leads into the inlet end 7 of the dehydrator. Finely divided iron oxide dust 8 contained in a hopper 9 is fed into the stream of liquid by pipe 10 connecting with pipe 6 or directly into the inlet end 7 of the drum 1 in the proper relative amounts. The material travels over the baffles 2 and 3 and at the exit end 11 is a substantially dry material which is removed through duct 12 and is carried away on conveyor 13. The heat necessary for the drying operation is provided by coal contained in hopper 14, the same being pulverized at 15 and being blown into the dehydrator through blower 16 and furnace 17. In place of coal, oil or gas or other fuel may be used. The temperature of the combustion gases as they enter the end 11 of dehydrator 1 is generally from 1800°–2200° F. and the temperature thereof at the exit end 7 is approximately 350° to 450° F. The temperature of the dried material at the exit end of the dehydrator is in the neighborhood of 600° F.

The reactions taking place in the dehydrator are briefly that at the end 7 of the dehydrator there is a gradual heating of the mixture and evaporation of water until the temperature has risen sufficiently high and the concentration of the acid is such that a reaction can occur between the iron oxide and the sulphuric acid. In the central section of the dehydrator the neutralizing reaction goes substantially to completion with the formation of water, which is evaporated substantially as fast as it is formed. The temperature in this section is probably fairly constant. At the exit end 11 there is evaporation of water and toward the end of such evaporation the temperature rises until complete dryness is obtained and the material leaves the dehydrator.

The dried material on the conveyor 13 can be mixed with pyrites 18 and with coal through the duct 19 and the mixture is fed through duct 20 into the slightly inclined rotating drum roaster 21 having baffles 22 therein. The material passes therethrough and is met by a countercurrent of gases produced by combustion of fuel from duct 23 in furnace 24 by the blast of air from blower 25. Reactions occur by reason of the admixture of iron sulphate with the carbonaceous reducing agent at the inlet end 26 of the roaster 21 whereby $SO_2$ is produced and is removed through pipe 27 through dust collector or separator 28 and through exit pipe 29, which leads to an apparatus for producing sulphuric acid therefrom. The material passes along to the exit end 30 of the roaster where the high temperature of the combustion gases causes a sintering action as well as some further oxidation to take place. The sintered oxide of iron which is usually a mixture of various iron oxides is removed through duct 31, conveyer 32 and is stored in hopper 33.

The iron oxide 8 is generally obtained from separator or dust collector 28 from the bottom 34 of which the very finely divided dust flows into the hopper 9 for use in the process.

The temperature of the gases at the furnace 24 is sufficiently high so as to produce a temperature at the exit end 30 of the roaster of about 1400–1800° F. At the inlet end 26 thereof the temperature of said gases is from 600 to 1000° F. The temperature of the sintered product as it leaves the roaster is about 600° F.

As a typical example of the operation of this invention one may take 100 pounds of spent acid from pigment manufacture containing from 20 to 22 per cent $H_2SO_4$ and from 12 to 14 per cent $FeSO_4$. To this is added from 15 to 20 pounds of iron oxide dust, preferably the light, fine dust from the end of the operation. The mixture is charged into the rotary kiln which acts as a dehydrator and as the temperature of the mass rises at the inlet end of the kiln to the reactive temperature, the oxide combines with the acid. Assuming that the oxide is in the form of FeO, the reaction is as follows:

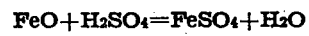
$$FeO + H_2SO_4 = FeSO_4 + H_2O$$

As the material passes on further reaction takes place. First, there is the evaporation of water forming a dry mass of $FeSO_4, 7H_2O$ in the central section of the kiln and in the end section the hydrated ferrous sulphate is transformed into a deliquescent sulphate which may be ferric-ferrous sulphate containing from about ½ to 1 mol. of $H_2O$. Because of the complete neutralization of the acid by the oxide there is no material amount of reduction in the dehydrator and, therefore, no loss of $SO_2$ or $SO_3$ gases therein.

The addition of oxide which largely corresponds to the composition $Fe_3O_4$, results in producing only half as much ferric sulphate as would be produced if ordinary iron ore, $Fe_2O_3$, were used. Moreover, by adding the oxide to the ferrous sulphate sulphuric acid solution before concentrating, there is practically no oxidation of the ferrous sulphate by the sulphuric acid, although when ferrous sulphate is heated with sulphuric acid in the absence of $Fe_3O_4$, ferric sulphate is produced. It is, of course, undesirable to produce large quantities of ferric sulphate as this tends to give off $SO_3$ in the roasting step which follows and it is one of the advantages of the present invention that on roasting, an $SO_2$ gas free from $SO_3$ is produced.

The dried mass is, after admixture with coal and metallic sulphides such as pyrites or pyrrhotite, then transferred to the roaster kiln where the material passes through the kiln. Because of the presence of the reducing agent, such as carbon, a reaction as follows will take place, assuming the ferrous sulphate is in the form of the mono-hydrate.

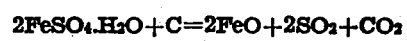
$$2FeSO_4.H_2O + C = 2FeO + 2SO_2 + CO_2$$

From the above description of our invention it is apparent that a number of advantages are obtained thereby. The use of iron oxide as a neutralizing medium provides a cheap means for obtaining the desired result. It furthermore utilizes substantially waste material which is difficult to dispose of and transforms it into a salable product. The use of the oxide has proven to be a highly successful means for the necessary complete neutralization of the acid. The time of neutralization is decreased because neutralization takes place at elevated temperatures. The excess of oxide insures the ready and complete neutralization of the acid. By reason of the continuous movement of the charge in the roaster countercurrent to the heating gases, the reduction takes place uniformly and at a constant rate, resulting in a substantially constant concentration of $SO_2$ in the gases produced in the operation.

Although we have described our invention setting forth a specific embodiment thereof, our invention is not limited to the details set forth. For example, other oxides than those produced at the end of the process may be used and the oxide need not be in finely divided, dust form. The temperatures, times of treatment, concentrations and proportions of ingredients may be varied to suit conditions. The process is not limited to the treatment of spent pickling solutions, but other solutions of similar character may also be treated thereby. The invention is further applicable to solutions of other substances wherein there is free acid and crystallizable salts which tend to interfere with the recovery of the acid radical. In the claims reference to pickling solutions and the sulphate radical is intended to cover the equivalents thereof as set forth herein. The iron oxide may be any of the well known oxides or mixtures thereof. The salts in the pickling solution may be ferrous or ferric sulphates or mixtures thereof and either or both of these sulphates may be formed in the neutralizing step. In the dehydrator and roaster there is provided steel rails for breaking up incrustations as they may form, but they may be omitted or other means substituted therefor. Our invention is to be broadly construed and is not to be limited except by the terms of the claims appended hereto.

What we claim is:—

1. A method of treating solutions containing free sulphuric acid and ferrous sulphate which comprises mixing therewith an iron oxide containing as a major component oxide corresponding to the composition $Fe_3O_4$, heating the mixture to a sufficiently high temperature to cause combination of said oxide with said acid, evaporating the mixture substantially to dryness and then heating the mixture in the presence of a reducing agent to remove the sulphur content as $SO_2$ and to produce an iron oxide residue.

2. A method of treating solutions containing free sulphuric acid and ferrous sulphate which comprises mixing therewith an oxide of iron produced by the process and corresponding to the composition $Fe_3O_4$, heating the mixture to a sufficiently high temperature to cause the combination of said oxide with said acid, evaporating the mixture substantially to dryness and then heating the mixture in the presence of a reducing agent to remove the sulphur content as $SO_2$ and to produce an iron oxide residue corresponding substantially to the composition $Fe_3O_4$, and utilizing a portion of said residue to neutralize the free sulphuric acid of a further portion of fresh solution.

3. A method according to claim 1 in which the solution is a waste liquor from the pickling of iron and steel.

4. A method according to claim 2 in which the solution is a waste liquor from the pickling of iron and steel.

5. A method according to claim 1 in which the temperature to which the solution and iron oxide is heated is at least 230–240° F.

6. A method according to claim 1 in which the temperature to which the solution and iron oxide is heated is at least 230–240° F. and the strength of the sulphuric acid is about 30–40%.

7. A method according to claim 1 in which the amount of iron oxide is in excess of the theoretical amount required for neutralizing the free sulphuric acid.

THOMAS C. OLIVER.
SAMUEL F. SPANGLER.